United States Patent [19]

Nakayama et al.

[11] Patent Number: 5,258,844
[45] Date of Patent: Nov. 2, 1993

[54] VIDEO CAMERA APPARATUS HAVING AN IMAGE PROJECTION FUNCTION

[75] Inventors: Jin Nakayama, Akishima; Makoto Sato, Fussa; Tohru Nakakusu, Hoya; Akihiro Tsukamoto, Hamura, all of Japan

[73] Assignee: Casio Computer Co., Ltd., Tokyo, Japan

[21] Appl. No.: 727,643

[22] Filed: Jul. 9, 1991

[30] Foreign Application Priority Data

| Jul. 13, 1990 | [JP] | Japan | 2-74558[U] |
| Jul. 26, 1990 | [JP] | Japan | 2-78681[U] |
| Aug. 31, 1990 | [JP] | Japan | 2-91369[U] |
| Sep. 25, 1990 | [JP] | Japan | 2-98955[U] |
| Oct. 8, 1990 | [JP] | Japan | 2-105206[U] |

[51] Int. Cl.$^5$ ............... H04N 5/30; H04N 5/74
[52] U.S. Cl. ............................ 358/209; 358/231; 358/909
[58] Field of Search ............ 358/909, 229, 225, 231, 358/209, 60, 224; 354/290, 291

[56] References Cited

U.S. PATENT DOCUMENTS

| 3,665,828 | 5/1972 | Reiter | 354/291 |
| 4,183,644 | 1/1980 | Tureck et al. | 354/291 |
| 4,755,869 | 7/1988 | Tanaka | 358/60 |
| 4,819,101 | 4/1989 | Lemelson . | |
| 4,824,210 | 4/1989 | Shimazaki . | |
| 4,835,563 | 5/1989 | Larish | 358/909 |
| 4,843,410 | 6/1989 | Kallenberg | 354/291 |
| 4,945,424 | 7/1990 | Hiroki et al. . | |
| 4,963,984 | 10/1990 | Womack | 358/60 |
| 5,040,058 | 8/1991 | Beamon, II | 358/60 |

FOREIGN PATENT DOCUMENTS 1-100574 7/1989 Japan .
1-115371 8/1989 Japan .

*Primary Examiner*—Michael T. Razavi
*Assistant Examiner*—Wendy R. Greening
*Attorney, Agent, or Firm*—Frishauf, Holtz, Goodman & Woodward

[57] ABSTRACT

A video camera apparatus with an image-projecting function comprises a recording/reproduction device for recording an image picked up by a pickup lens and an image pickup element on a recording medium, such as a magnetic tape, and reproduces the recorded image from the recording medium. This apparatus is also equipped with a liquid crystal display panel for displaying the image reproduced by the recording/reproduction device or the picked-up image. When light from a light source is irradiated on the liquid crystal display panel, the image thereon can be projected, enlarged by a projection lens. The pickup lens may also serve as the projection lens.

13 Claims, 20 Drawing Sheets

VIDEO CAMERA APPARATUS HAVING AN IMAGE PROJECTION FUNCTION

BACKGROUND OF THE INVENTION

1. Field of the Invention

The present invention relates to a video camera. More specifically, the present invention pertains to a video camera with which picked-up images can impromptu be watched.

2. Description of the Related Art

In recent years, a video camera has rapidly spread. To watch images picked up with this video camera, an image-recorded cassette tape has to be taken out to be loaded in a reproducing video deck, or a video camera itself has to be connected directly to a television set for image reproduction. The operations of reproduction are very troublesome, and images cannot be watched without a television set to hand.

A view finder, belonging to the video camera, displays reproduced images, but it is so small that the images on the finder are hardly watched and that only one person can see the display.

SUMMARY OF THE INVENTION

To overcome the above-described shortcomings, it is therefore an object of the present invention to provide a video camera which can impromptu reproduce picked-up images and display them for many persons at a time.

To achieve the object, a video camera according to the present invention comprises display means for displaying an image picked up, and means for magnifying and projecting the image displayed by the display means.

Even without a television set near by, the video camera including those means can provide impromptu reproduction of picked-up images by projecting them on to a screen, such as a wall, according to the situation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above

DETAILED DESCRIPTION OF THE PREFERRED EMBODIMENTS

First Embodiment

The first embodiment of the present invention will now be described referring to the associated drawings. "Video camera" may be of a system that records a motion picture on a cassette tape or a system that records a still picture on a floppy disk or in an IC memory.

Figure 1:
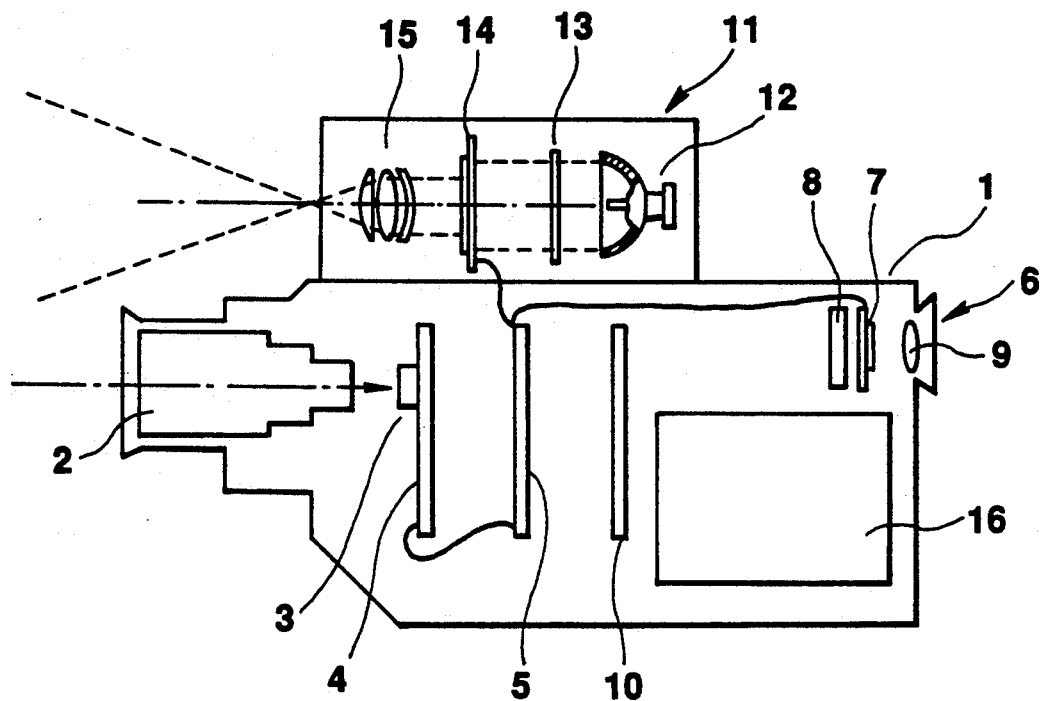
FIG. 1 is a schematic diagram illustrating the internal structure of a video camera apparatus according to the first embodiment of the present invention.

FIG. 1 schematically illustrates the interior of a video camera embodying the present invention. Referring to FIG. 1, reference numeral "1" denotes a video camera assembly, numeral "2" is a projection lens, and numeral "3" is a CCD, numeral "4" is a recording-system circuit board where the CCD 3, a CCD driver, a signal processor, etc. are mounted, numeral "5" is a reproduction-system circuit board, and a numeral "6" is a viewfinder. The viewfinder 6 displays display data coming from the circuit board 5 on a monochromatic liquid crystal display (LCD) panel 7. A user can see an image, illuminated by a back light 8, through an eyepiece 9. The viewfinder 6 can display an image output by the CCD 3 as it is during image pickup or reproduction data of an image temporarily recorded. Reference numeral "10" is a control circuit board.

Reference numeral "11" is a projector section which includes a light source 12, an infrared absorbing filter 13, a color LCD panel 14 and a projection lens 15. The light source 12 comprises a high-luminance lamp, such as a metal halide lamp, and a reflector for reflecting light from this lamp toward the color LCD panel 14 as parallel light. The light from the light source 12 enters the color LCD panel 14 after its infrared component is eliminated by the filter 13. The color LCD panel 14 is of a dot matrix type having three primary color filters. A display image created by the light passing the color LCD panel 14 is enlarged and projected by the projection lens 15. The display data on the display panel 14 is supplied from the reproduction-system circuit board 5. Reference numeral "16" denotes a deck section having a cassette tape (not shown) installed.

Figure 2:
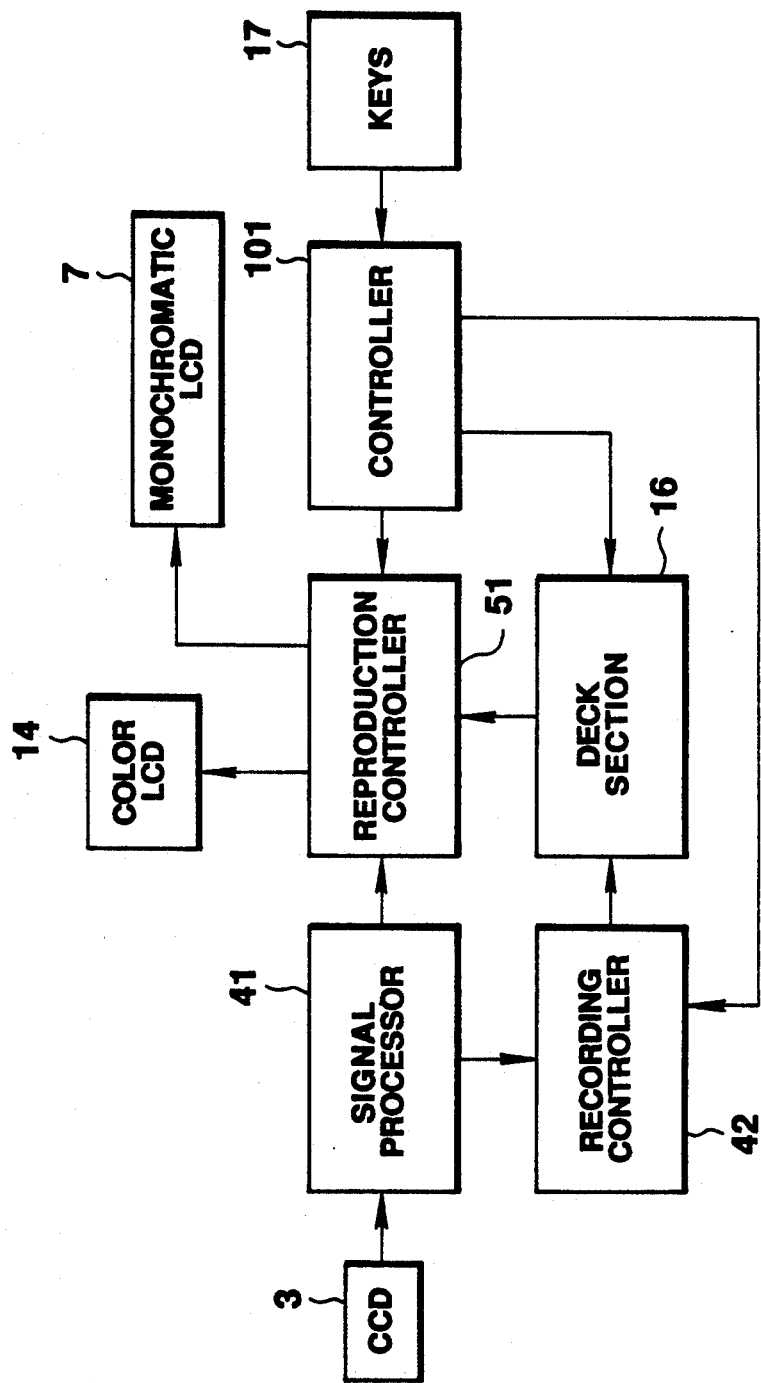
FIG. 2 is a block diagram illustrating the circuit structure of the video camera apparatus of the first embodiment.

FIG. 2 is a schematic circuit block diagram. Image data sensed by the CCD 3 is properly processed to be separated into a Y signal (luminance signal) and a C signal (color signal) in a signal processor 41. A record controller 42 records the Y and C signals on a cassette tape by means of the magnetic heads of the deck section 16. In play mode, a signal from the magnetic heads of the deck section 16 is processed in a reproduction controller 51 and the resultant signal will be displayed on the monochromatic LCD panel 7 of the viewfinder 6 and the color LCD panel 14 of the projector section 11.

A controller 101, formed on the control circuit board 10, controls recording, reproduction, fast forward, rewinding, and so forth based on the operation of keys 17. The controller 101 also controls the display mode to display data simultaneously on both LCD panels 7 and 14 or only on one of them.

Figure 3:
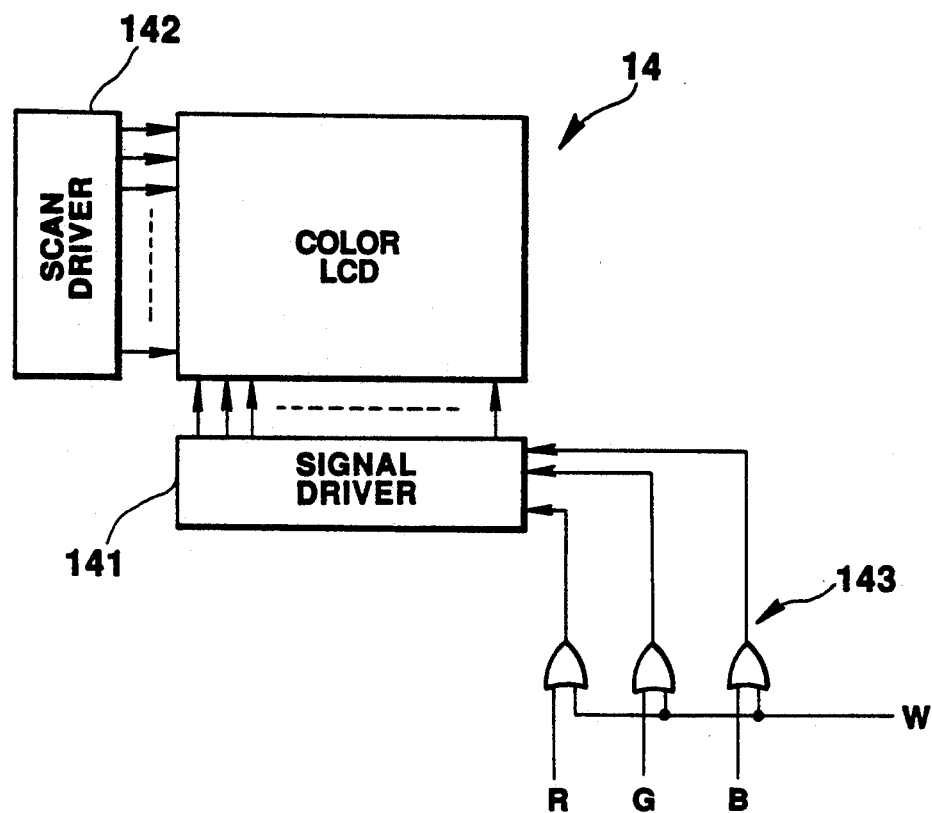
FIG. 3 is a diagram showing the peripheral circuit of a color liquid crystal display panel.

FIG. 3 illustrates the circuits around the color LCD panel 14. A signal driver 141, and a scan driver 142 may be designed integral with the LCD panel 14 or provided on the reproduction-system circuit board 5. The signal driver 141 receives RGB display data from the reproduction controller 51. When the projector section 11 is used as a video light, however, white (W) data (data to yield $R+G+B=W$) is supplied via OR gates 143 to every pixel from the controller 101. As a result the whole pixels of the color LCD panel 14 becomes light-transmitting status, permitting white light to be projected from the projection lens 15.

Second Embodiment

The second embodiment of this invention will be described referring to the associated drawings.

Figure 4:
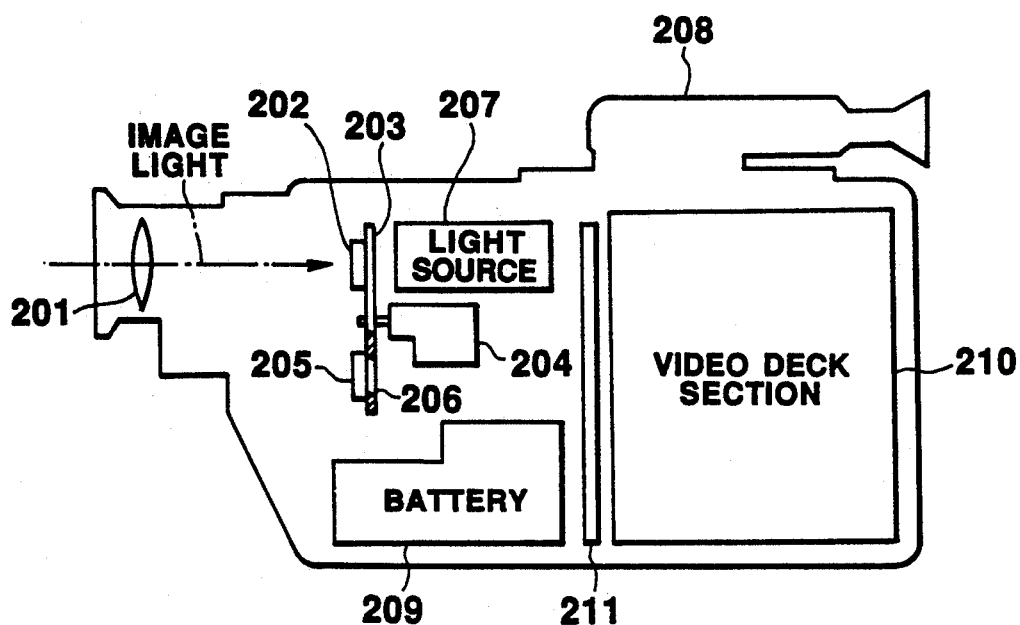
FIG. 4 is a schematic diagram illustrating the internal structure of a video camera apparatus according to the second embodiment of the present invention.
Figure 5:
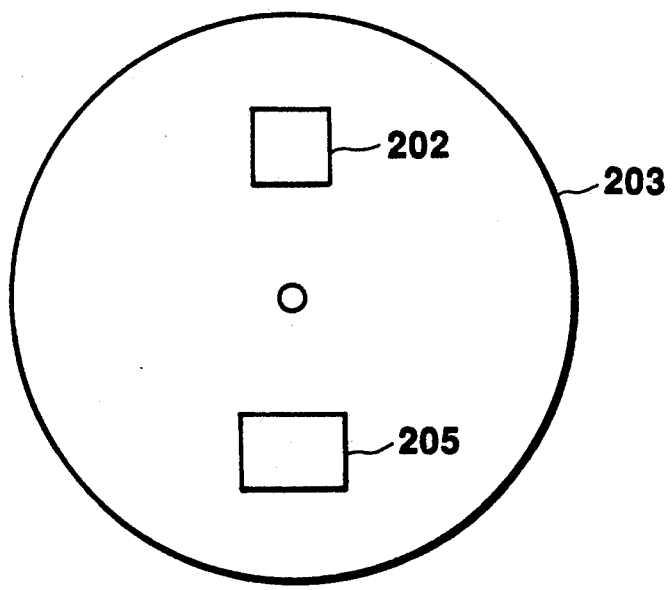
FIG. 5 is a diagram for explaining a circuit board shown in FIG. 4.
Figure 6:
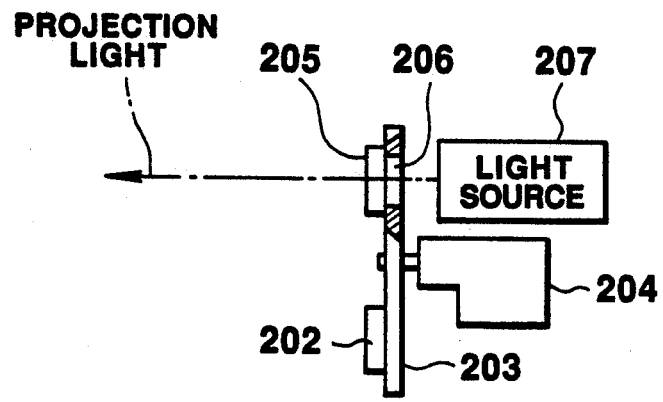
FIG. 6 is a diagram for explaining the operation of the second embodiment.

FIGS. 4 through 6 illustrate the second embodiment. Referring to FIG. 4 which is a schematic diagram of a video camera apparatus, reference numeral "201" denotes a pickup lens, and numeral "202" denotes a CCD which converts image light from the pickup lens 201 into an image signal. This CCD 202 is mounted on a disk-shape substrate 203 as shown in FIG. 5. This substrate 203, is rotatable by a motor 204. An LCD panel 205 is provided 180° apart from the CCD 202 to cover an opening 206 formed in the substrate 3.

The LCD panel 205 is designed to have liquid crystal sealed between two light-transmitting substrates, for example, and is capable of displaying an image picked up by the pickup lens 201 and CCD 202. A light source 207 comprising a high-luminance lamp, such as a halogen lamp, is provided where it faces the pickup lens 201 with the substrate 203 in between.

Referring to FIG. 4, reference numeral "208" is a viewfinder, numeral "209" a battery source, numeral "210" a video deck section, and numeral "211" a circuit board.

In picking up an image with the video camera apparatus having the above-described arrangement, the CCD 202 is caused to face the pickup lens 201 so that the image light from the pickup lens 201 is irradiated on the photoelectric converting surface of the CCD 202, as shown in FIG. 4. The image signal resulting from the photoelectric conversion by the CCD 202 is processed, and is recorded on a video cassette loaded in the video deck section 210.

To see the image picked up, the board 203 is turned a half way by the motor 204 to make the LCD panel 205 face the pickup lens 201 as shown in FIG. 6. The image recorded on the video cassette is reproduced and is displayed on the LCD panel 205 while the light source 207 is turned on to irradiate light on the LCD panel 205. Consequently, the light irradiated on the LCD panel 205 from the light source 207 passes through the pickup lens 201 and is projected as image light. The picked-up image can therefore be seen without using the viewfinder 208 or any television set.

Figure 7:
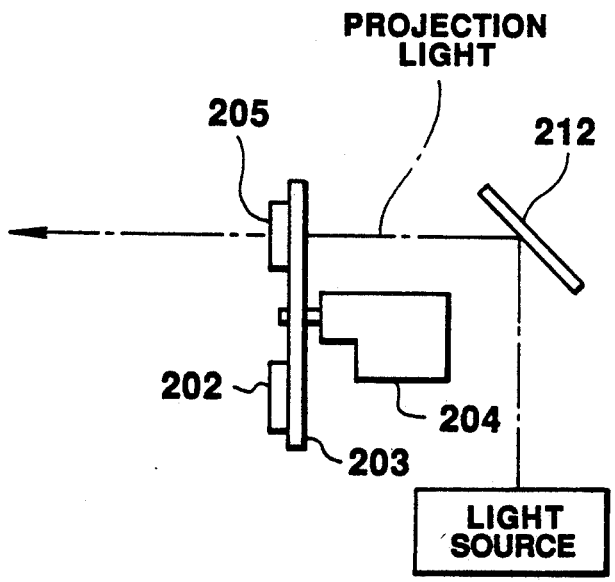
FIG. 7 is a diagram showing a modification of the second embodiment.
Figure 8:
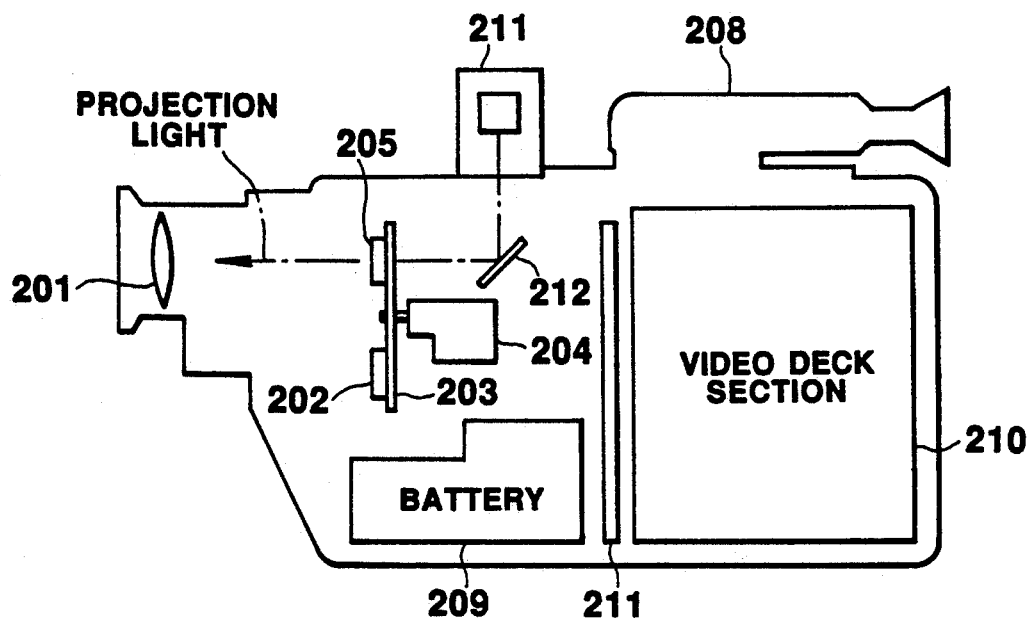
FIG. 8 is a diagram illustrating another modification of the second embodiment.

While the board 203 is rotated to permit the LCD panel 205 to face the pickup lens 201 in the above embodiment, the board 203 may be slid to provide the same alignment. While the light from the light source 207 is sent directly to the LCD panel 205 in this embodiment, the light from the light source 207 may be supplied via a mirror 212 to the LCD panel 205 as shown in FIG. 7. Although in the light source 207 is provided to face the pickup lens 201 with the board 203 in between in this embodiment, the light source 207 may be mounted on the board 203, or may be mounted detachable on the outer wall of the video camera as shown in FIG. 8.

Third Embodiment

The third embodiment of this invention will be described below with reference to FIG. 9.

Figure 9:
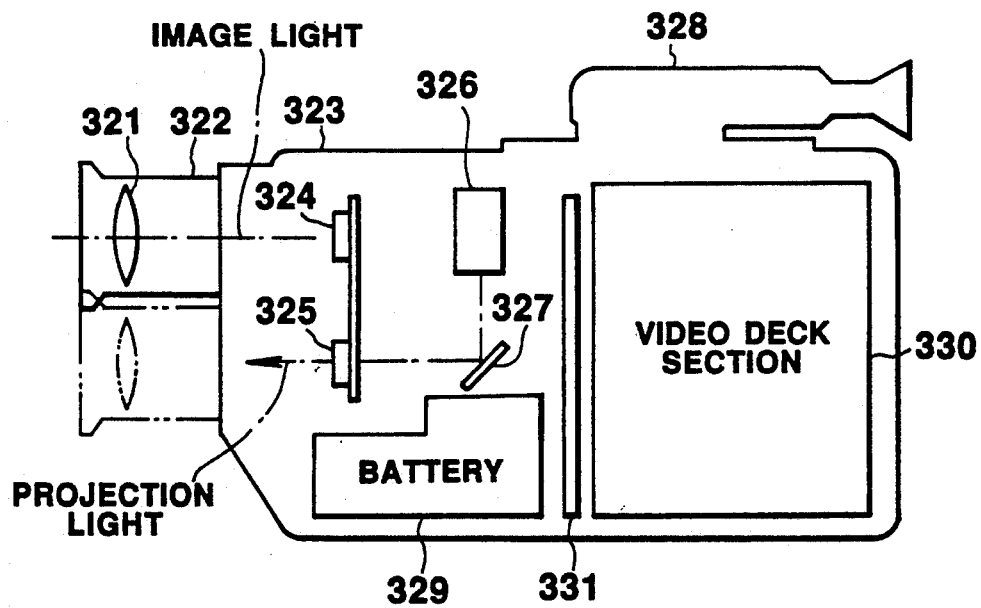
FIG. 9 is a schematic diagram illustrating the internal structure of a video camera apparatus according to the third embodiment of the present invention.

Referring to FIG. 9, reference numeral "321" denotes a pickup lens, and numeral "322" a lens holder for holding the lens 321. This lens holder 322 is provided movable in, for example, the longitudinal direction to a video camera assembly (hereinafter referred to as "camera assembly") 323. A CCD 324 converts image light from the pickup lens 321 into an image signal. A LCD panel 325 displays the image picked up by the pickup lens 321 and the CCD 324. A light source 326 irradiates light via a mirror 327 onto the LCD panel 325. These components are securely arranged in the camera assembly 323. In this diagram, reference numeral "328" is a viewfinder, numeral "329" a battery source, numeral "330" a video deck section, and numeral "331" a circuit board.

In viewing an image picked up with the thus constituted video camera apparatus, the lens holder 322 is moved to make the pickup lens 321 face the LCD panel 325. Then, the picked-up image is displayed on the LCD panel 325, and the light from the light source 326 is irradiated on the LCD panel 325. Consequently, the light irradiated on the LCD panel 325 passes through the pickup lens 321 and is projected as image light. The picked-up image can therefore be seen without using the viewfinder 328 or any television set, as per the second embodiment.

Fourth Embodiment

The fourth embodiment of this invention will be described below referring to FIG. 10.

Figure 10:
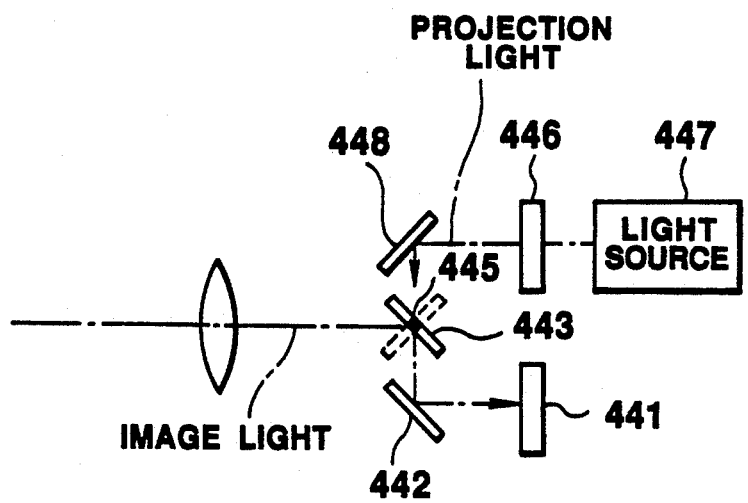
FIG. 10 is a diagram for explaining the operation of the fourth embodiment.

In FIG. 10, reference numeral "441" denotes a CCD whose photoelectric converting face receives image light from a pickup lens 444 via a fixed mirror 442 and a movable mirror 443. The movable mirror 443 is rotatable around a shaft 445 on which a driving unit (not shown), such as a motor, is mounted.

Reference numeral "446" is an LCD panel which displays an image picked up by the pickup lens 444 and CCD 441, and numeral "447" is a light source which irradiates light on the LCD panel 443. A fixed mirror 448 is disposed on the light-leaving side of the LCD panel 446, facing the movable mirror 443. In this diagram, reference numeral "449" is a viewfinder, numeral "450" a battery source, numeral "451" a video deck section, and numeral "452" a circuit board.

In viewing an image picked up with the thus constituted video camera apparatus, the movable mirror 443 is turned about a half way to the broken-line position from the real-line position to switch the optical path of the pickup lens 444 to the CCD side from the LCD panel side. Then, the picked-up image is displayed on the LCD panel 446, and the light from the light source 447 is irradiated on the LCD panel 446. As a result, the display image on the LCD panel 446 is projected through the pickup lens 444, so that the picked-up image can be seen without using the viewfinder or any television set.

Fifth Embodiment

This embodiment comprises a camera assembly, a pickup lens for taking the image of an object to be picked up (hereinafter simply referred to as "object") within the camera assembly, an image pickup element for picking up the image of the object taken into the camera assembly, a liquid crystal viewfinder for displaying the image picked up by the image pickup element, a recording/reproduction section for recording the object image picked up by the image pickup element onto a recording medium and reproducing the recorded image from the recording medium, an LCD element for displaying the reproduced image of the object, a projection section for projecting the image on the LCD element outside, a light source provided in the camera assembly, and a selecting section for selectively permitting the light from the light source to enter the viewfinder or the LCD element.

According to this embodiment, since the LCD element for displaying the object image reproduced by the recording/reproduction section is provided in the camera assembly and the projection section for projecting the image on the LCD element outside is also provided, the image of the object picked up can be seen impromptu without using the viewfinder or any television set. Since there is the selecting section which selectively permits the light from the light source to enter the liquid crystal viewfinder or the LCD element, it is unnecessary to provide two light sources, one for the viewfinder and the other for the projection purpose, thus simplifying the structure of the video camera apparatus.

The fifth embodiment of this invention will be described below referring to the associated drawings.

Figure 11:
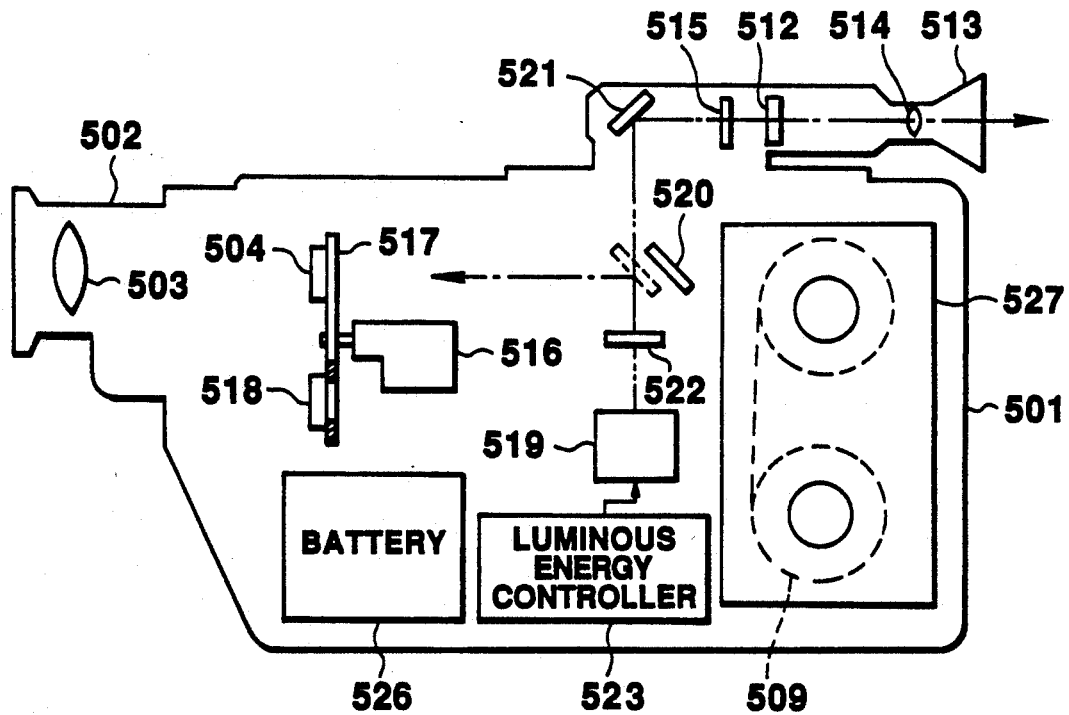
FIG. 11 is a schematic diagram illustrating the internal structure of a video camera apparatus according to the fifth embodiment of the present invention.

FIG. 11 schematically illustrates the arrangement of a video camera apparatus according to the fifth embodiment. An assembly 501 of this video camera apparatus is provided integrally with an image pickup section 502 that holds a pickup lens 503. The pickup lens 503 carries the image of an object inside the camera assembly 501, and the object image taken inside the camera assembly 501 is irradiated on the photoelectric converting face of a CCD 504.

Figure 12:
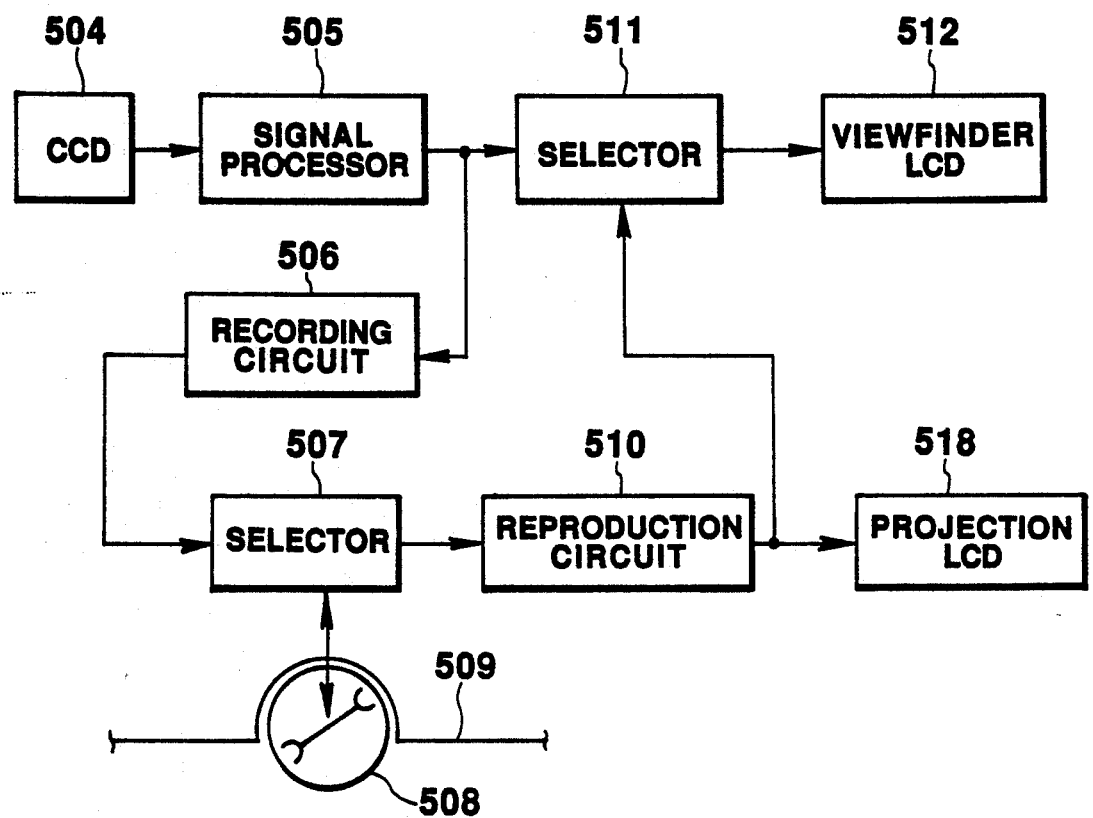
FIG. 12 is a block diagram showing the circuit structure of the video camera apparatus of the fifth embodiment.

The CCD 504 photoelectrically converts the object image, taken inside the camera assembly 501 by the pickup lens 503, into an image signal, which in turn is supplied to a signal processor 505 as shown in FIG. 12. This signal processor 505 converts the image signal from the CCD 504 into a video signal. The video signal from the signal processor 505 is sent to a recording circuit 506 and also to an LCD element for a viewfinder (hereinafter simply called "viewfinder LCD") 512 via a selector 511.

The recording circuit 506 subjects the video signal from the signal processor 505 to predetermined processing (such as FM modulation of the luminance signal component of the video signal), then records the resultant video signal onto a magnetic tape 509 serving as a recording medium. The video signal from the recording circuit 506 is sent via the selector 507 to a rotary head 508, which records the signal on the magnetic tape 509. The video signal recorded on the magnetic tape 509 is read out by the rotary head 508 to be reproduced via the selector 507 by the reproduction circuit 510.

The viewfinder LCD 512 serves to display the object image picked up by the CCD 504 on a viewfinder section 513 of the camera assembly 501. The viewfinder section 513 (of smaller diameter than pickup lens 503) is provided with an eyepiece 514 for enlarging the display image on the viewfinder LCD 512. On the lightincident side of the viewfinder LCD 512 is provided a diffusion plate 515 that uniformly diffuses light and prevents an observer from directly viewing the light source.

The CCD 504 is mounted on a rotational plate 517 which is driven by a motor 516. This rotational plate 517 serves to project the object image picked up by the video camera outside through the pickup lens 503. An LCD element for projection (hereinafter called "projection LCD") 518 is provided 180° apart from the CCD 504 on the same circumference as the CCD 504 lies, as in FIG. 5.

Figure 14:
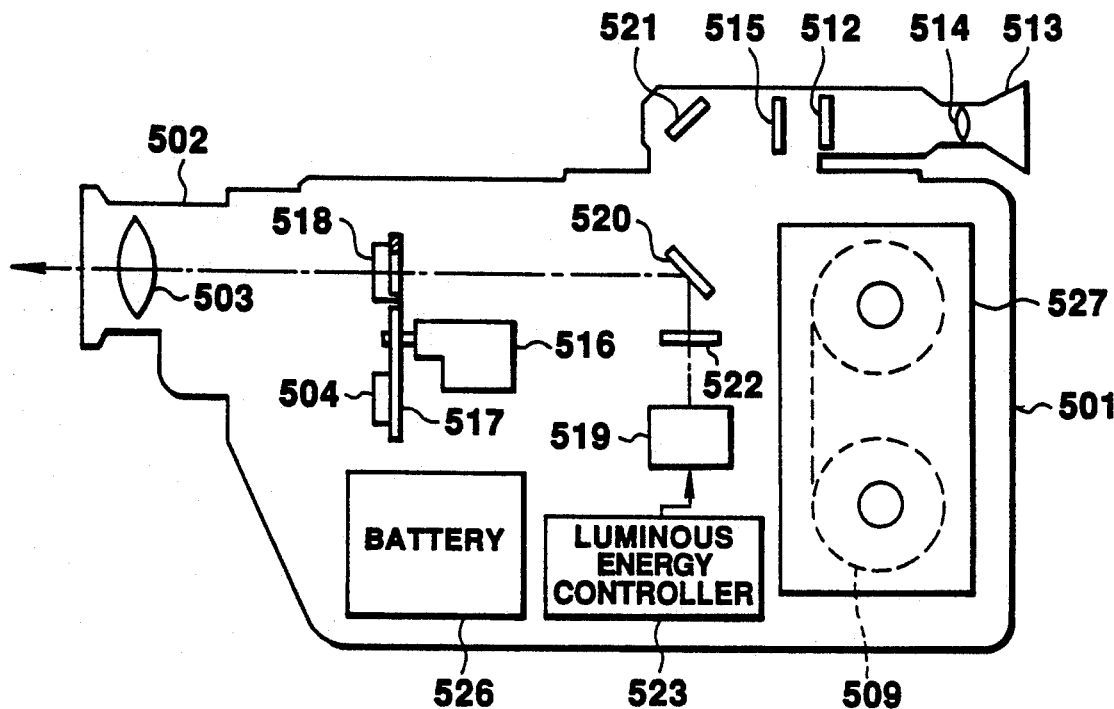
FIG. 14 is a diagram for explaining the operation of the fifth embodiment.

The projection LCD 518, which displays the object image reproduced by the reproduction circuit 510, is moved to face the pickup lens 503 as shown in FIG. 14 when the rotational plate 517 is turned a half way by the motor 516.

In the camera assembly 501 are provided a light source 519 comprising a halogen lamp, for example, and an optical-path selecting mirror 520 for selecting permitting the light from the light source 519 to enter the LCD 512 or LCD 518. This mirror 520 is slidable by a driving unit (not shown). When the mirror 520 is in the real-line position as shown in FIG. 11, the light from the light source 519 enters the LCD 512 through the mirror 521 and diffusion plate 515. When the mirror 520 is in the broken-line position and the LCD 518 faces the pickup lens 503, the light from the light source 519 enters the projection LCD 518. A color correction filter 522 is provided between the light source 519 and the optical-path selecting mirror 520 to correct a color component specific to the halogen lamp.

Figure 13:
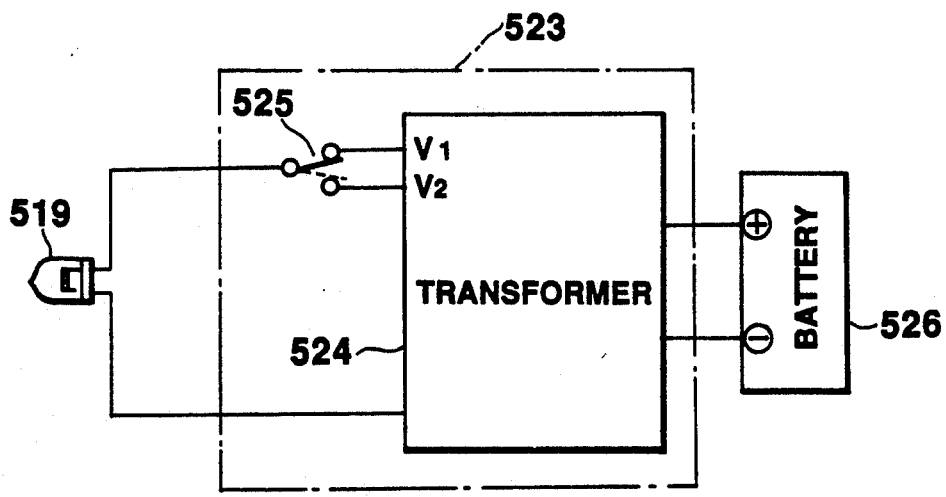
FIG. 13 is a diagram illustrating a luminous energy controlling circuit according to the fifth embodiment.

The amount of the light from the light source 519 can be controlled by a luminous energy controller 523. This controller 523 includes a transformer 524 having output voltage terminals $V_1$ and $V_2$, and a selecting switch 525 provided between the light source 519 and the output voltage terminals $V_1$ and $V_2$, as shown in FIG. 13; the terminals $V_1$ and $V_2$ provide powers of 300 W (30 V, 10 A) and 5 W (5 V, 1A) to the light source 519 to activate it. The switch 525 permits two-level selection of the luminous energy of the light source 519, namely "bright" and "dark". The transformer 524 is supplied with a source voltage from a battery source 526. Reference numeral "527" in FIG. 11 is a video cassette.

In picking up the image of an object with the thus constituted video camera apparatus, the object image is taken inside the camera assembly 501 through the pickup lens 503, and is then sent on the photoelectric converting face of the CCD 504. The object image incident on the photoelectric converting face is photoelectrically converted into an image signal. The image signal from the CCD 504 is converted into a video signal by the signal processor 505, and is then recorded on the magnetic tape 509 by the recording circuit 506 using the rotary head 508.

Meanwhile, the video signal output from the signal processor 505 is supplied via the selector 511 to the viewfinder LCD 512. At this time, the light from the light source 519 is sent via the color correction filter 522, optical-path selecting mirror 520, mirror 521 and diffusion plate 515 to the LCD 512. As a result, the image of the object currently being picked up is displayed on the viewfinder section 513 of the camera assembly 501. It is to be noted that the light from the light source 519 is at this time controlled by the luminous energy controller 523 to have luminous energy low enough not to hurt the viewing eye of the user.

In reproducing the object image recorded on the magnetic tape 509, the motor 516 is activated first to turn the rotational plate 517 a half way, permitting the projection LCD 518 on the rotational plate 517 to face the pickup lens 503. Under this condition, the object image recorded on the magnetic tape 509 is reproduced by the rotary head 508 and the reproduction circuit 510, and the reproduced image is displayed on the projection LCD 518. At this time, the optical-path selecting mirror 520 is moved to the broken-line position from the real-line position shown in FIG. 11, permitting the light from the light source 519 to enter the LCD 518 through the color correction filter 522 and the mirror 520. The reproduced image on the LCD 518 is projected outside via the pickup lens 503. It is to be noted that the light from the light source 519 at this time is adjusted to have the maximum energy level by the luminous energy controller 523.

According to this embodiment, as described above, the object image recorded on magnetic tape 509 can be displayed on the projection LCD 518, and the image on the LCD 518 can be projected outside through the pickup lens 503. Therefore, the image of the object picked up can be seen impromptu without using the viewfinder or any television set.

Since, according to this embodiment, the optical-path selecting mirror 520 can permit the light from the light source 519 to selectively enter either the LCD 512 or LCD 518, it is unnecessary to provide two light sources inside the camera assembly 501, one for the viewfinder and the other for the projection purpose, thus simplifying the structure of the video camera apparatus.

In addition, this embodiment can allow the luminous energy controller 523 to adjust the luminous energy of the light source 519 in two levels, so that when the light from the light source 519 is to enter the viewfinder LCD 512, the luminous energy is reduced by the controller 523, thus preventing the user from being hurt.

While the CCD 504 and projection LCD 518 are mounted on the rotational plate 517, which is turned to make the LCD 518 face the pickup lens 503 according to the fifth embodiment, the CCD 504 and LCD 518 may be mounted on a slidable plate so that sliding this plate will cause the LCD 518 to face the pickup lens 503.

Figure 15:
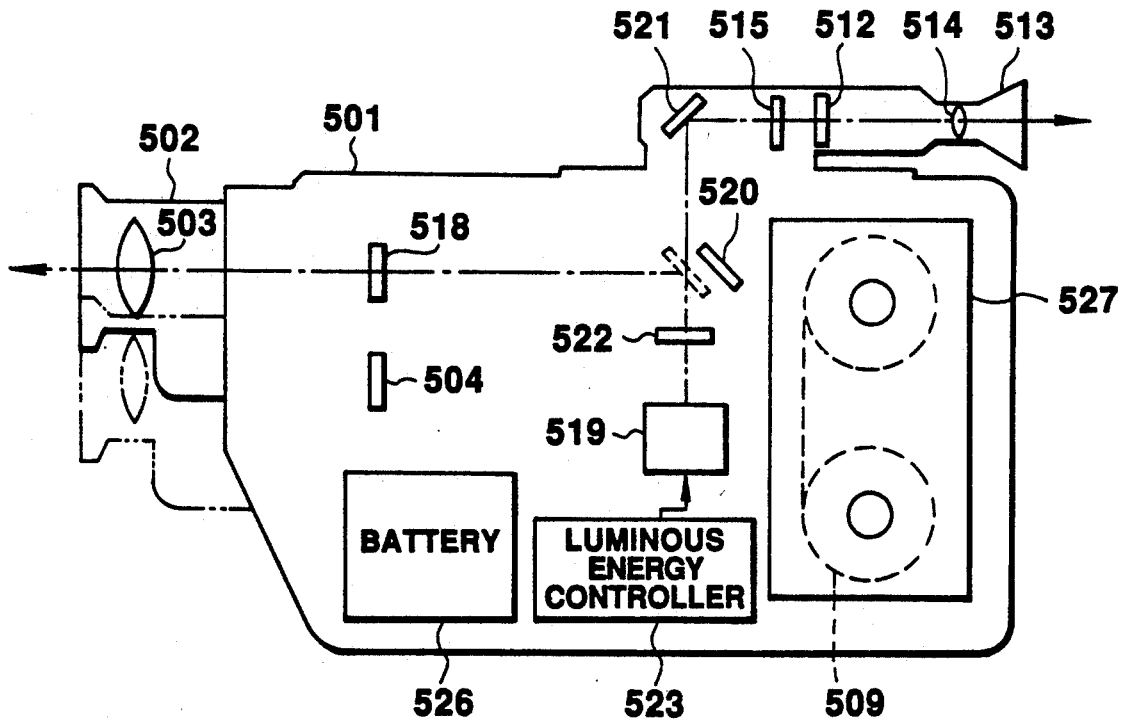
FIG. 15 is a diagram illustrating a modification of the fifth embodiment.

Further, while the CCD 504 and LCD 518 are provided rotatable to the camera assembly 501 in the fifth embodiment, the pickup lens 503 may be provided movable to the camera assembly 501 as shown in FIG. 15, so that moving the pickup lens 503 will project the display image on the projection LCD 518 outside through the pickup lens 503.

Figure 16:
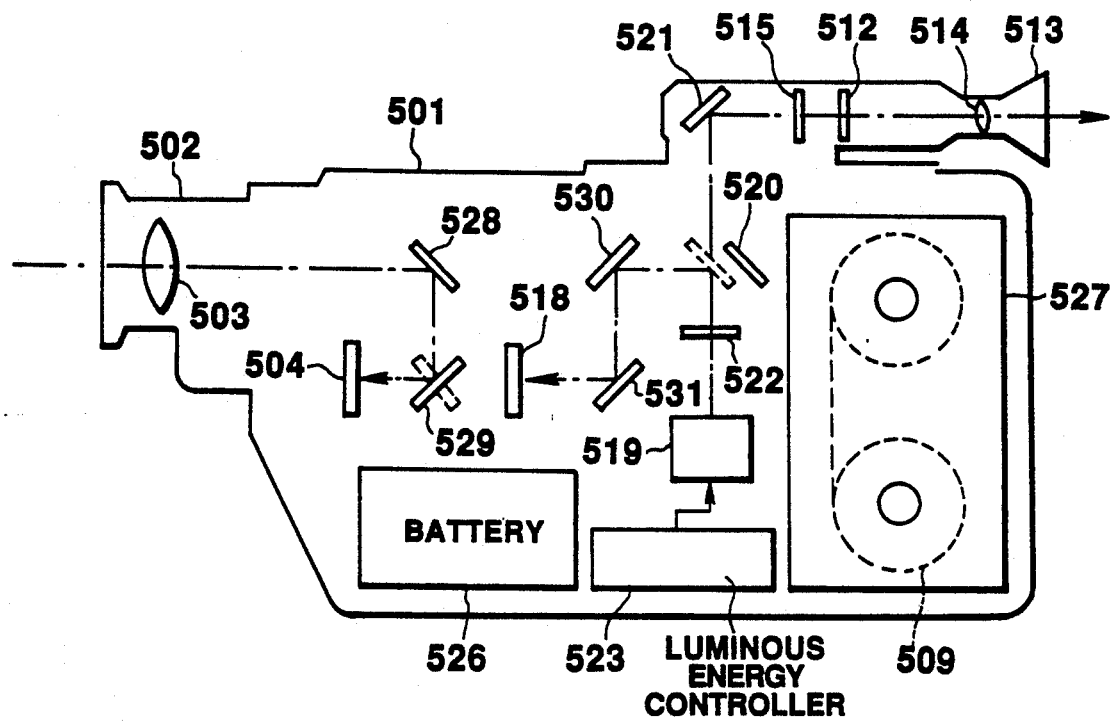
FIG. 16 is a diagram illustrating another modification of the fifth embodiment.

Furthermore, the arrangement may be modified in such a way that the object image from the pickup lens 503 is sent on the photoelectric converting face of the CCD 504 via the mirror 528 and optical-path selecting mirror 529, and the image light passing through the LCD 518 is permitted by the mirror 529 to be projected outside through the pickup lens 503, as shown in FIG. 16. It is to be noted that reference numerals "530" and "531" in FIG. 17 denote mirrors for allowing the light from the light source after passing the optical-path selecting mirror 520 to enter the projection LCD 518.

While the display image of the LCD 518 is projected outside through the pickup lens 503 in the fifth embodiment, a projection lens may be provided in the camera assembly 501 to allow the display image on the projection LCD 518 to be projected outside through the projection lens.

In addition, while the foregoing description of the individual embodiments has been given with reference to the case where the present invention is applied to a video camera which picks up a motion picture, this invention can of course be applied to an electronic still video camera which picks up a still picture.

Sixth Embodiment

The video camera according to this embodiment comprises a camera assembly, an image pickup section for picking up the image of an object within the camera assembly, a recording/reproduction section for recording the object image picked up by the image pickup section onto a recording medium and reproducing the recorded image from the recording medium, an illumination device provided detachable to the camera assembly, a display section for displaying the object image reproduced by the recording/reproduction section, and a switching section for permitting the display section to be positioned in front of the illumination device in a first state and permitting the display section to be accommodated in the camera assembly in a second state.

With this arrangement, when the display section is positioned in front of the illumination device, the image on the display section is projected by the illumination light from the illumination device, so that the picked-up image can be seen impromptu without using the viewfinder or any television set.

The sixth embodiment of this invention will be described below referring to the associated drawings.

Figure 17:
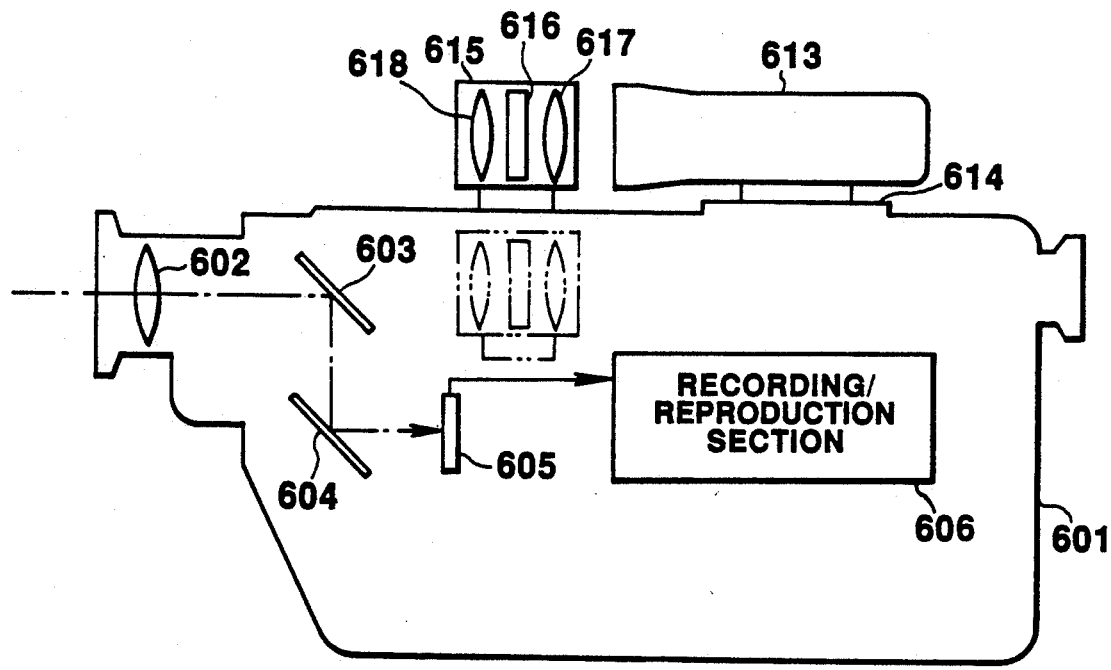
FIG. 17 is a schematic diagram illustrating the structure of a video camera apparatus according to the sixth embodiment.
Figure 18:
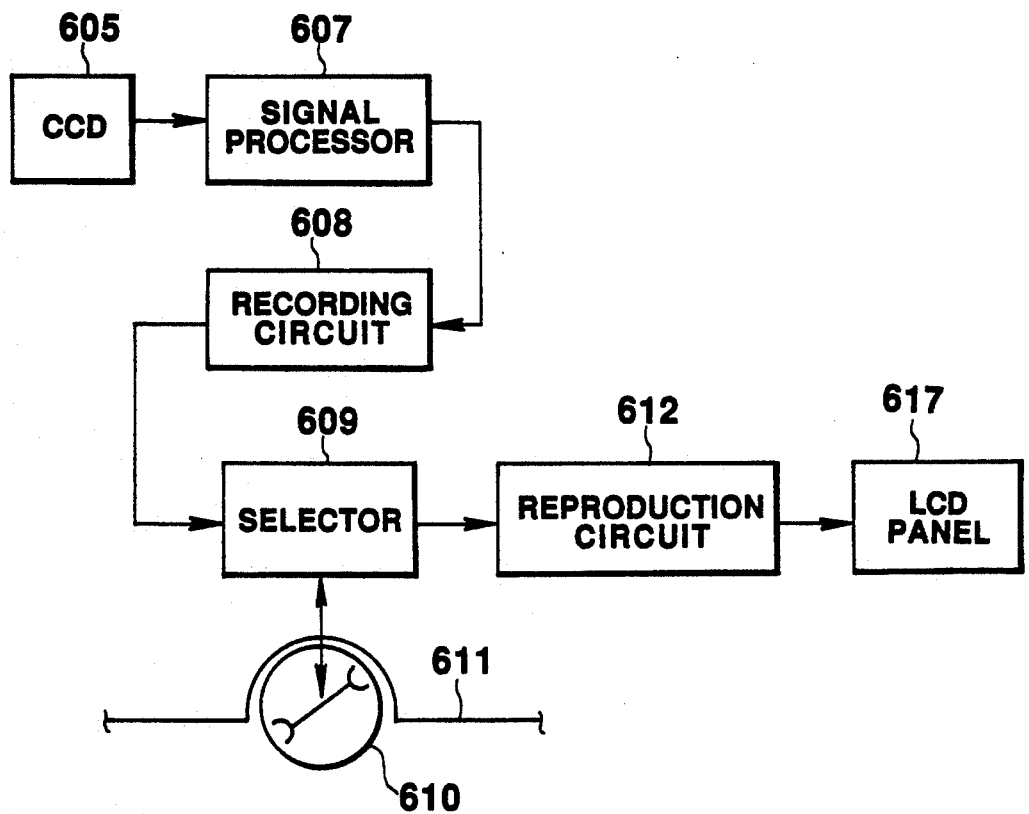
FIG. 18 is a block diagram illustrating the circuit structure of the video camera apparatus of the sixth embodiment.

FIG. 17 schematically illustrates a video camera apparatus according to the sixth embodiment. An assembly 601 of this video camera apparatus accommodates a pickup lens 602 that carries the image of an object inside the camera assembly 601. The object image taken inside the camera assembly 601 is sent on the photoelectric converting face of a CCD 605 via mirrors 603 and 604.

The CCD 605 photoelectrically converts the object image on the photoelectric converting face into an image signal, which in turn is supplied to a recording-/reproduction section 606. This recording/reproduction section 606 processes the image signal from the CCD 605 to record the object image on a recording medium and reproduces the recorded image therefrom. The recording/reproduction section 606 comprises a signal processor 607 for processing the image signal from the CCD 605 to be a video signal of the NTSC system, a recording circuit 608 for recording the video signal from the signal processor 607 on a magnetic tape 611 serving as a recording medium by means of a selector 609 and a rotary head 610, and a reproduction circuit 612 for reading out the recorded video signal from the magnetic tape 611 by means of the rotary head 610 and the selector 609, as shown in, for example, FIG. 19.

Figure 19:
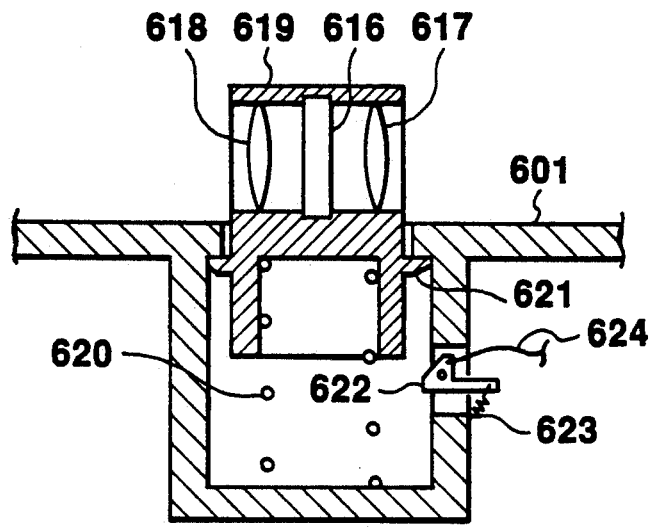
FIG. 19 is a diagram for explaining the operation of the sixth embodiment.
Figure 20:
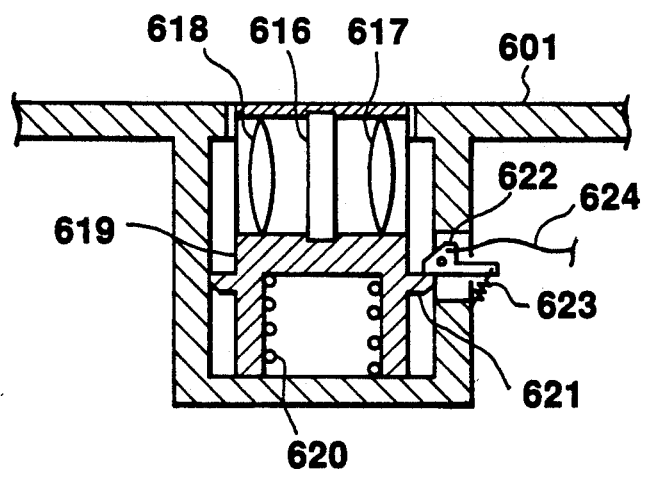
FIG. 20 is a diagram for explaining the operation of the sixth embodiment.

An illumination device 613 is provided detachable on the top of the camera assembly 601 by means of an attachment shoe 614, and an LCD device 615 for displaying an picked-up image reproduced by the recording/ reproduction section 606 is provided in front of the illumination device 613. The LCD device 615 includes an LCD panel, a collimator lens 617 located on the light-incident side of the LCD panel 616, and a projection lens 618 located on the light-leaving side of the LCD panel 616, as shown in FIGS. 19 and 20. The light from the illumination device 613 is corrected into parallel light by the collimator lens 617, and this parallel light is permitted to enter the LCD panel 616.

The LCD panel 616, collimator lens 617 and projection lens 618 are held by a holding member 619 provided retainable in the camera assembly 601. This holding member 619 is urged upward by a coil spring 620 to thereby position the LCD panel 616, collimator lens 617 and projection lens 618 in front of the illumination device 613. The holding member 619 is provided with an engage section 621 which engages with a pawl member 622 provided in the camera assembly 601. When the holding member 619 is pushed inside the camera assembly 601 against the spring force of the coil spring 620, the engage section 621 engages with the pawl member 622, thus permitting the LCD device 615 to be accommodated in the camera assembly 601. It is noted that the pawl member 622 is urged to rotate in a given direction by a spring 623 and is connected to a wire 624. This wire 624 is also connected to an unlock button (not shown), so that pressing this button releases the engagement between the pawl member 622 and the engage section 621.

According to the video camera apparatus having the above-described arrangement, when the LCD device 615 is positioned in front of the illumination device 613, the display image on the LCD panel 616 is projected, enlarged by the illumination light from the illumination device 613 through the projection lens 618. Therefore, the image of the object picked up can be seen impromptu without using the viewfinder or any television set. As the LCD device 615 is retainable in the camera assembly 601, the LCD panel 616 will not shield the illumination light of the illumination device 613 at the time of picking up an image. Nor will the LCD device 615 interfere when the camera assembly 601 is to be retained in its case.

Figure 22:
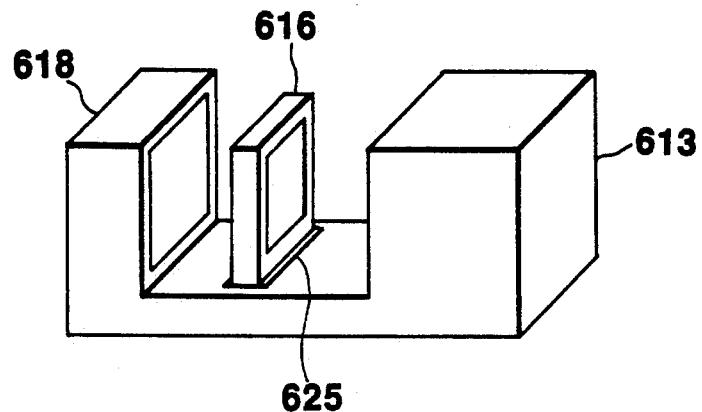
FIG. 22 is a diagram illustrating another modification of the sixth embodiment.
Figure 23:
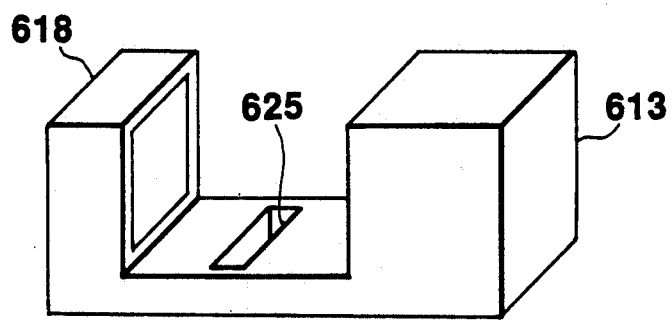
FIG. 23 is a diagram for explaining the operation of the modification of the sixth embodiment.

A modification of the sixth embodiment will be described below referring to FIGS. 21 to 23. Those components corresponding to or identical to what is shown in FIGS. 17 to 20 are denoted by the same reference numerals, so that only those different from the sixth embodiment will be discussed below.

Figure 21:
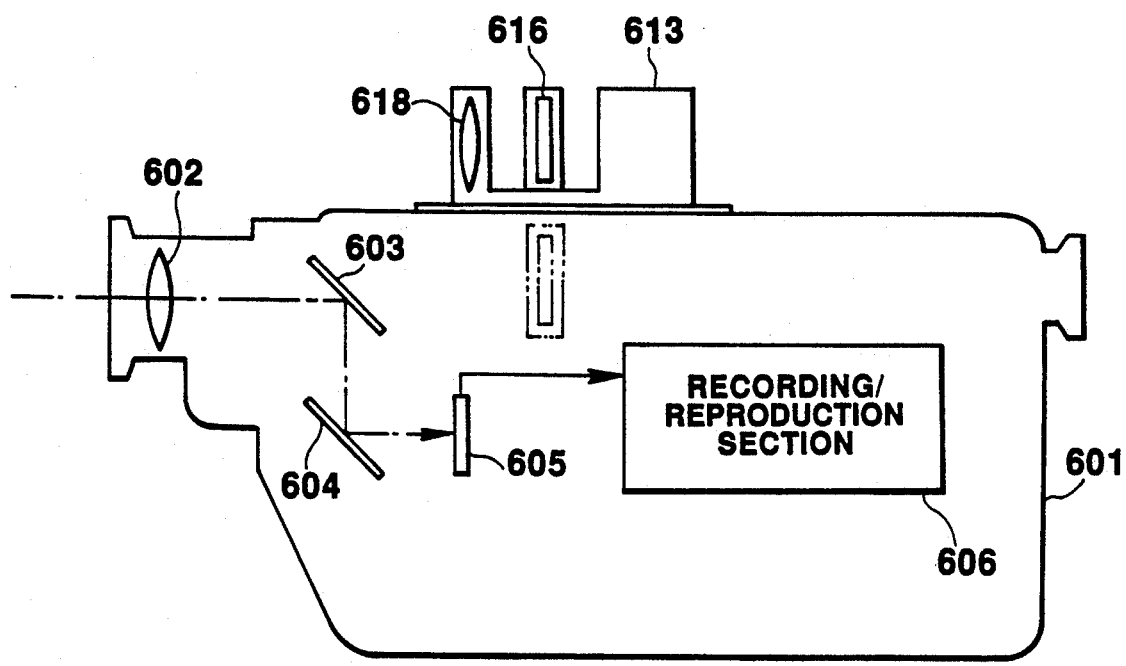
FIG. 21 is a diagram illustrating a modification of the sixth embodiment.

As shown in FIG. 21, the illumination device 613 and projection lens 618 are designed integral with each other, and detachable to the camera assembly 601. An opening 625 is formed between the illumination device 613 and projection lens 618 as shown in FIGS. 22 and 23, from which the LCD panel 616 can protrude.

When the LCD panel 616 accommodated in the camera assembly 601 protrudes from the opening 625 to come between the illumination device 613 and projection lens 618, the display image of the LCD panel 616 is projected by the illumination light from the illumination device 613. This can permit the user to view the picked-up image of the object impromptu without using the viewfinder or any television set, as per the sixth embodiment.

While the collimator lens 617 is located on the light-incident side of the LCD panel 616 to correct the light from the illumination device 613 into parallel light in the sixth embodiment, if the light from the illumination device 613 is parallel light originally, it is unnecessary to provide the collimator lens 617 in that particular position.

While the display image on the LCD panel 616 is projected for the viewing purpose by the light from the illumination device 613 according to the sixth embodiment and the modification thereof, the arrangement may be modified so as to permit the user to directly see it through a window provided in the camera assembly 601.

In addition, while the foregoing description of the sixth embodiment and its modification has been given with reference to the case where the present invention is applied to a video camera which picks up a motion picture, this invention can of course be applied to an electronic still video camera which picks up a still picture.

In short, the sixth embodiment and its modification can provide a video camera apparatus which permits the user to view the picked-up image impromptu without using the viewfinder or any television set. As the display section is retainable in the camera assembly, the display section will not shield the illumination light of the illumination device at the time of picking up an image. Nor will the display section interfere when the camera assembly is to be retained in its case. The video camera apparatus is therefore excellent in terms of the accommodation.

Seventh Embodiment

A video camera apparatus according to the present invention comprises a camera assembly, an image pickup section for taking the image of an object inside of the assembly and picking up the image, a viewfinder for displaying the image picked up in the image pickup section by means of liquid crystal, and a projection section for projecting the pickup image liquid-crystal-displayed in the viewfinder to the outside. The picked-up image can therefore be projected impromptu without a television set near by, as per the abovedescribed embodiments.

The seventh embodiment of the present invention will now be described referring to FIGS. 24 through 28.

Figure 24:
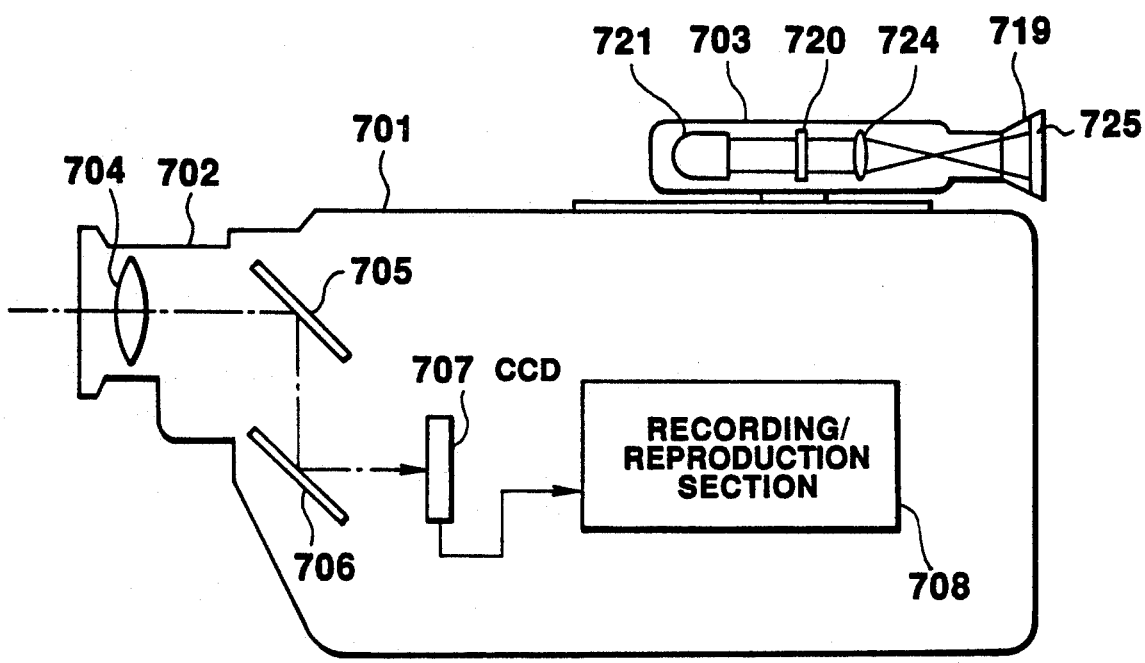
FIG. 24 is a schematic diagram illustrating the internal structure of a video camera apparatus according to the seventh embodiment of the present invention.

FIG. 24 schematically illustrates the video camera apparatus according to the seventh embodiment. A camera assembly 701 of the video camera apparatus includes an image pickup section 702 for picking up the object image, and a viewfinder 703 for displaying the object image which is picked up by the image pickup section 702.

The image pickup section 702 involves a pickup lens 704 for taking the object image inside of the camera assembly 701, and a CCD 707 which photoelectrically converts the picked-up image into an image signal to be taken out. The image signal from the CCD 707 is to be supplied to a recording/reproduction section 708. The object image, taken inside the camera assembly 701 by the pickup lens 704, is sent through mirrors 705 and 706 to the photoelectric converting face of the CCD 707.

Figure 25:
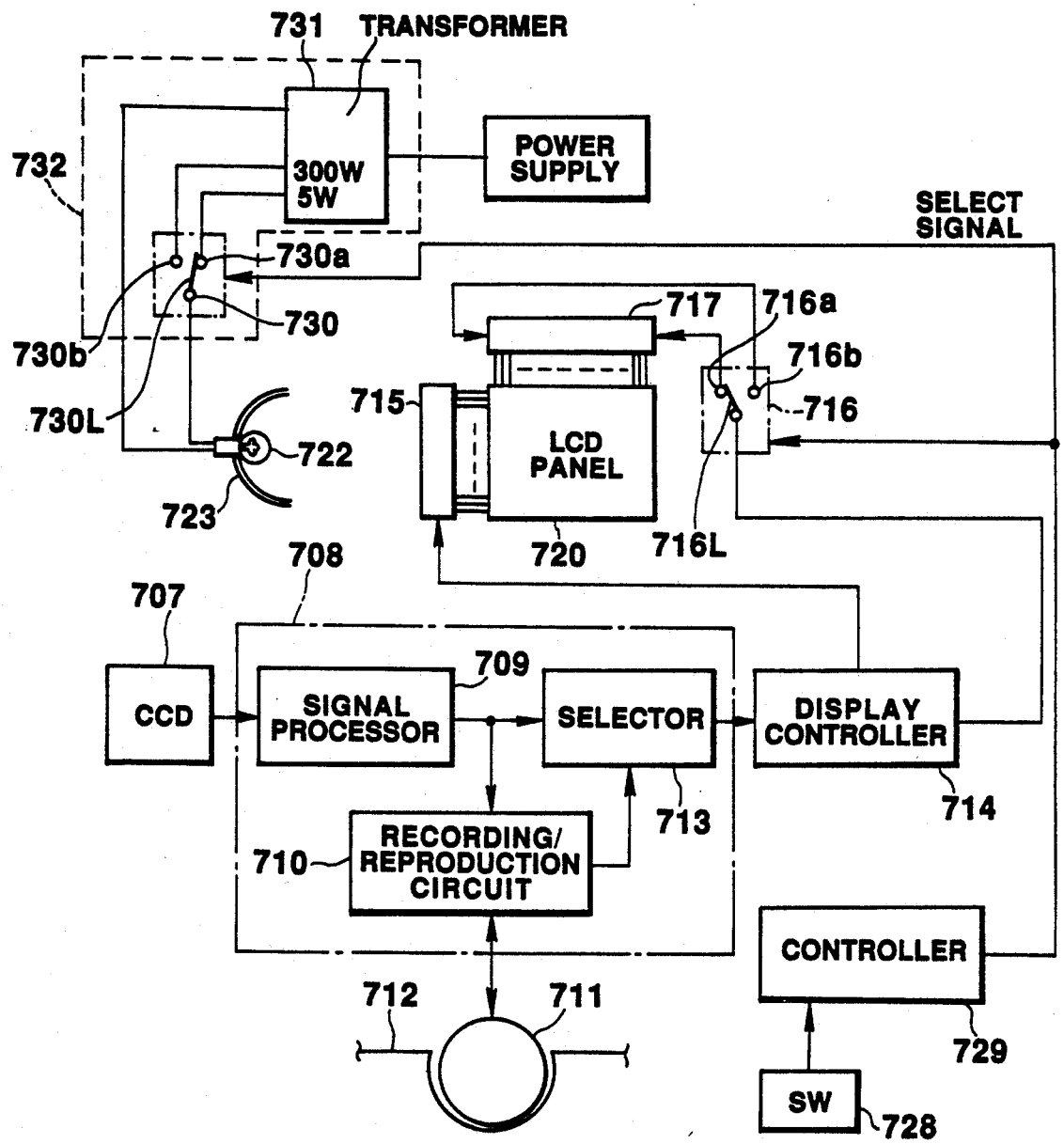
FIG. 25 is a block diagram illustrating the circuit structure of the video camera apparatus of the seventh embodiment.

The recording/reproduction section 708 is designed, for example, as shown in FIG. 25. The image signal from the CCD 707 is sent to a signal processor 709, which in turn processes the image signal to be a television signal of the NTSC system. The image signal processed to be the NTSC signal in the signal processor 709 is supplied to a display controller 714 via a selector 713, and also to a recording/reproduction circuit 710. The recording/reproduction circuit 710 records the image signal sent from the signal processor 709 on a magnetic tape 712 by means of a rotational head 711, and reads the recorded image signal from the magnetic tape 712 via the rotational head 711. The image signal, read from the magnetic tape 712 by the recording/reproduction circuit 710, is sent via the selector 713 to the display controller 714. According to the image signals sent from the signal processor 709 and the recording/reproduction circuit 710, the display controller 714 drives an LCD panel 720 to be described later. The display controller 714 sends a scan signal to a scan driver 715 for driving the scanning line of the LCD panel 720, and supplies a video signal via a selector 716 to a signal driver 717 for driving the signal line of the LCD panel 720. The selector 716 is designed that a movable switch 716L is switched from a first fixed contact 716a to a second fixed contact 716b in accordance with a select signal sent from a controller 729 to be described later.

Figure 26:
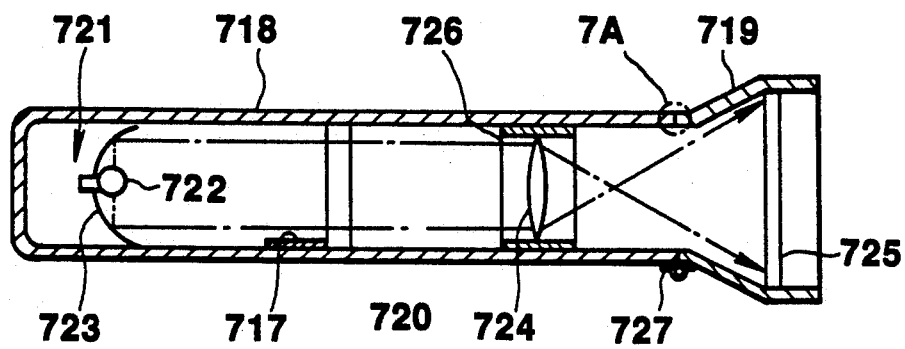
FIG. 26 is a diagram showing the structure of a viewfinder of the seventh embodiment.

The viewfinder 703 includes, as shown in FIG. 26, a viewfinder body 718 and an eyepiece section 719 provided at the tip portion of the viewfinder 718 which has the LCD panel 720 inside. The scan driver 715 and the signal driver 717 are connected to the LCD panel 720. The picked-up images are displayed on the LCD panel 720 by the scan signal and video signal sent respectively from these drivers 715 and 717. The signal driver 717 is connected via a selector 716 to the display controller 714 as described above. The selector 716 serves to change the direction of the video signal to be sent to the signal driver 717, i.e., to invert the right and left sides of the image to be displayed on the LCD panel 720.

There is an illumination device 721 provided behind the LCD panel 720 in the viewfinder body 718. The illumination device 721 comprises a light source 722, such as a halogen lamp, and a reflector 720 which reflects light from the light source 722 toward the LCD display panel 720. The illuminated light left from the illumination device 721 transmits the LCD panel 720 to enter a projection lens 724. The light source 722 is connected to a luminous energy controller 732 as shown in FIG. 25. The luminous energy includes a selector 730 which selects a movable switch 730L from a first fixed contact 730a to a second fixed contact 730b according to a select signal from the controller 729, and a transformer 731 which supplies 300W and 5W to the selector 730. The luminous energy controller 732 serves to control the quantity of the luminous energy of the back light of the LCD panel 720.

The projection lens 724 projects image light transmitted through the LCD panel 720 on to the eyepiece section 719 where a light-transmitting screen 725 is provided. The projection light from the projection lens 724 are sent to the back face of the light-transmitting screen 725, through which the projected image is displayed. The picked-up image displayed in the LCD panel 724 is to be projected on to the rear face of the light-transmitting screen 725 by the projection lens 724. The projection lens 724 is held in a lens holder 726 provided slidable in the viewfinder body 724. The lens holder 726 slides back and forth to focus on the projected image.

Figure 27:
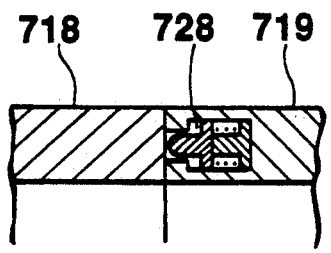
FIG. 27 is a detailed diagram illustrating a section 7A shown in FIG. 26.

The eyepiece section 719 is attached to the viewfinder body 718 with a hinge 727. By rotating the eyepiece section 719 on the hinge 727, the light-transmitting screen 725 can be left out of the path of the projection light which is transmitted through the projection lens 724. The eyepiece section has a contact switch 728, as shown in FIG. 27, which is turned on by a contact with the tip of the viewfinder body 718. With the contact switch 728, it is detectable if the light-transmitting screen 725 is left out of the path of the projection light. Further this contact switch 728 is connected to the controller 729. When a signal is sent through the contact switch 728 to the controller 729, the select signal is supplied from the controller 729 to the selectors 716 and 730.

Figure 28:
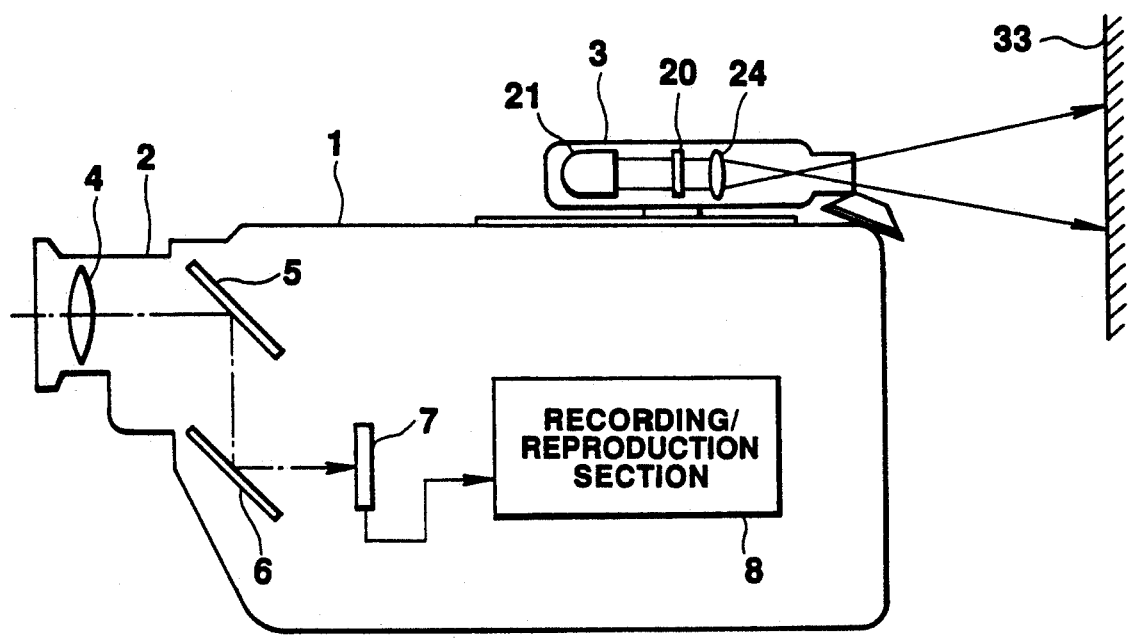
FIG. 28 is a diagram for explaining the operation of the seventh embodiment.

According to the video camera apparatus with the above-described arrangement, as shown in FIG. 28, the eyepiece section 719 is rotated on the hinge 727 to leave the light-transmitting screen out of the projection light path, allowing the picked-up image displayed in the LCD panel 720 to be projected via the projection lens 724 on to a room wall 733, for example. In the above-described embodiment, the picked-up image can be projected on to, for example, a wall, which makes it possible to impromptu watch the picked-up image.

If the light-transmitting screen 725 is once moved out of the projection light path by rotating the eyepiece section 719 on the hinge 727, the contact switch 728 is rendered off. Accordingly, the controller 729 sends the select signal to the selectors 716 and 730 to select the movable switches 716L and 730L of the selectors 716 and 730 from the first fixed contacts 716a and 731a to the second fixed contacts 716b and 731b, respectively. Thus, the sides of the picked-up image displayed in the LCD panel 720 are inverted, while the level of the luminous energy of the back light to irradiate the LCD panel 720 are changed from low to high. According to this embodiment, therefore, by switching the direction of the video signal sent to the signal-side driver 724 by means of the selector 716, it is possible to project the picked-up image on the wall or the like in such a manner that it will not have the right and left sides inverted as compared with the picked-up image on the LCD panel 720, when it is projected on the back of the light-transmitting screen 725. When the image on the LCD panel 720 is projected on the back of the screen 725, the luminous energy of the light from the illumination device 721 is weak, preventing the user's eyes from being hurt.

Figure 29:
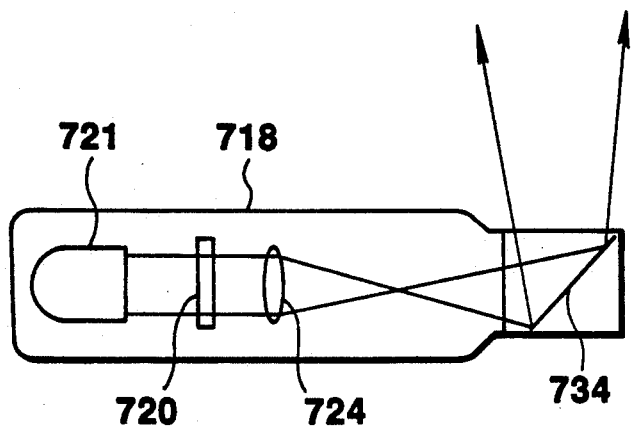
FIG. 29 is a diagram illustrating a modification of the seventh embodiment.

While the right and left side of the picked-up image on the LCD panel 720 are inverted by the selector 716 before the image is projected on the wall 733 or the like in a room in the seventh embodiment, a mirror (or prism) 734 may be attached to the tip of the viewfinder body 718 instead of using the selector 716 as shown in FIG. 29.

Figure 30:
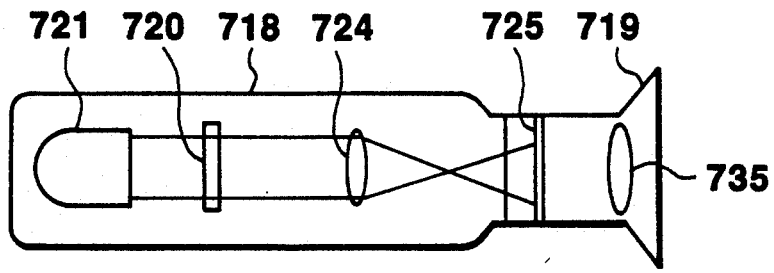
FIG. 30 is a diagram illustrating another modification of the seventh embodiment.

Further, while the eyepiece section 719 is provided with the light-transmitting screen 725 in the seventh embodiment, the screen 725 and an eyepiece 735 may be provided in the eyepiece section 719, as shown in FIG. 30, so that the image projected on the back of the screen 725 can be viewed, enlarged by the eyepiece 735.

A modification of the seventh embodiment will be described below referring to FIGS. 31 and 32. Those components corresponding to or identical to what is shown in FIGS. 24 to 26 are denoted by the same reference numerals, so that only those different from the seventh embodiment will be discussed below.

Figure 31:
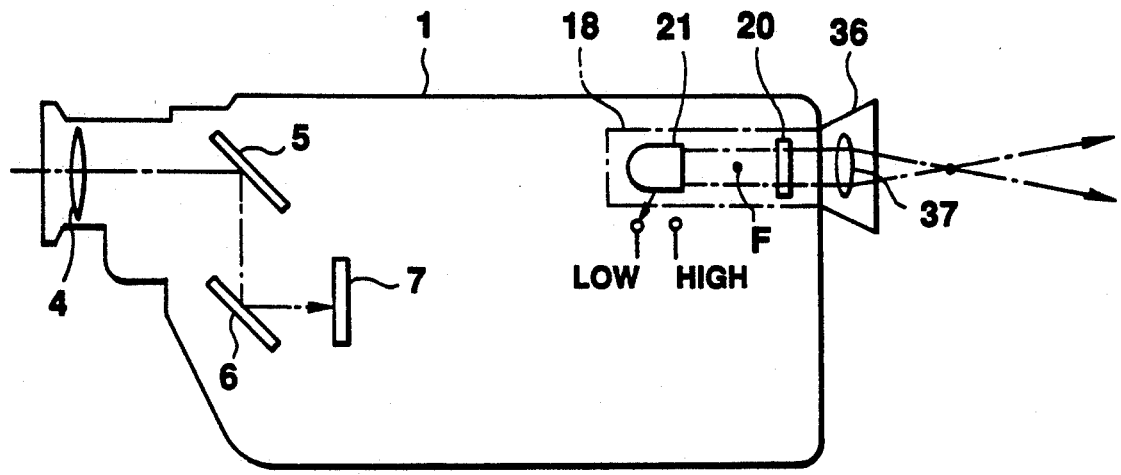
FIG. 31 is a diagram illustrating a further modification of the seventh embodiment.
Figure 32:
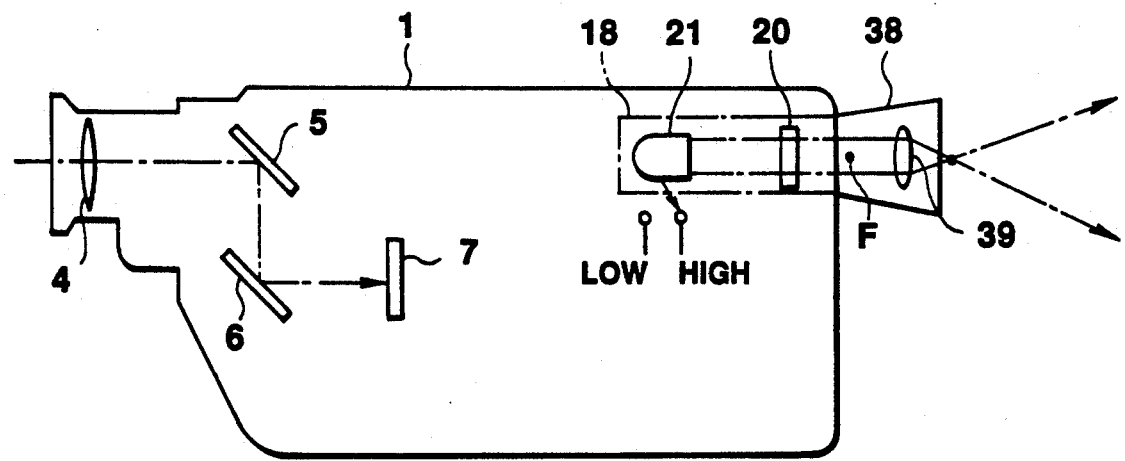
FIG. 32 is a diagram for explaining the operation of the modification shown in FIG. 31.

Referring to FIGS. 31 and 32, reference numeral "736" is a first eyepiece section provided detachable to the viewfinder body 718, with an eyepiece 737 supported in the first eyepiece section 736 to permit the user to view the picked-up image on the LCD panel 720 as a virtual image. This eyepiece 737 has its focus F lying between the LCD panel 720 and the illumination device 721 as shown in FIG. 31, so that the image on the LCD panel 720 can be viewed as a virtual image. Reference numeral "738" is a second eyepiece section provided detachable to the viewfinder body 718, with a projection lens 739 supported in the second eyepiece section 738 to permit the user to view the picked-up image on the LCD panel 720 as a real image. This projection lens 739 has its focus F lying in front of the LCD panel 720 as shown in FIG. 32, so that the image on the LCD panel 720 can be viewed as a real image.

According to the thus constituted video camera apparatus, when the first eyepiece section 736 is detached from the viewfinder body 718 and the second eyepiece section 738 is attached thereto, the picked-up image on the LCD panel 720 is projected on the wall in a room through the projection lens 739 supported in the second eyepiece section 738. The picked-up image can therefore be easily seen impromptu without any television set.

While the first eyepiece section 736 is replaced together with the eyepiece 737 with the second eyepiece section 738 in the above embodiment, shifting the eyepiece 737 can permit switching between a virtual image and a real image, so that the picked-up image can be projected on a wall as a real image.

According to the seventh embodiment, as described above, the picked-up image displayed on the LCD panel located in the viewfinder can be projected outside the camera assembly, thus permitting the user to view the image impromptu without any television set.

In the embodiments, those which are of direct relevance to this invention were described in detail and those which are not of direct relevance to this invention but known from the prior art were omitted from the description and illustration. For example, a liquid crystal projector is known from the U.S. Pat. No. 4,824,210, a video camera with a monitor apparatus is disclosed in the U.S. Pat. No. 4,945,424, and a circuit configuration used in a video camera is disclosed in the U.S. Pat. No. 4,819,101. Further, Japanese Unexamined Utility Model Publication Hei 1-100,574 shows a recording/reproducing apparatus with a liquid crystal television to which a video camera is detachable attached. The contents of these patents and the publication are incorporated into this application by a reference.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A video camera apparatus comprising:
    a pickup lens system for picking up light from an object;
    an image pickup element for picking up said light from said pickup lens system, and for converting said light into an image signal;
    a liquid crystal display panel for displaying an image of said light picked up by said pickup lens system and said image pickup element;
    a light source for irradiating light on said liquid crystal display panel when a display image on said liquid crystal display panel is to be projected;
    first guide means defining a first guide path for guiding light from said light source to said pickup lens system through said liquid crystal display panel, so that said display image on said liquid crystal display panel is projected through said pickup lens system;
    second guide means defining a second guide path for guiding said light picked up by said pickup lens system directly to said image pickup element without passing said light through said liquid crystal display panel; and
    selecting means for selectively operating one of said first and second guide means to cause light to pass through one of said first and second guide paths.

2. An apparatus according to claim 1, wherein said image pickup element and said liquid crystal display panel are mounted on a same board, said board being movable to permit said display image on said liquid crystal display panel to be projected through said pickup lens system.

3. An apparatus according to claim 1, wherein said image pickup lens system is movable to permit said display image on said liquid crystal display panel to be projected through said pickup lens system.

4. A video camera according to claim 1, further comprising a viewfinder for displaying said image of said light picked up by said image pickup element to enable a user to monitor said image, a diameter of said pickup lens system being larger than that of said viewfinder.

5. A video camera apparatus comprising:

a pickup lens system for picking up light from an object;

an image pickup element for picking up said light from said pickup lens system, and for converting said light into an image signal;

recording means for recording said image signal in a memory;

first guide means defining a first guide path for guiding light from said object to said image pickup element through said pickup lens system;

reproducing means for reproducing said image signal recorded in said memory;

a liquid crystal display panel for displaying an image corresponding to said image signal reproduced by said reproducing means;

a light source for irradiating light on said liquid crystal display panel;

second guide means defining a second guide path for guiding light from said light source to said pickup lens system through said liquid crystal display panel, so that a display image on said liquid crystal display panel is projected;

a direct-view type viewfinder for displaying an image of said light picked up by said image pickup element and an image corresponding to said image signal reproduced by said reproducing means, a diameter of said pickup lens system being greater than that of said viewfinder;

first selecting means for operating said first guide means when the video camera is in a recording mode; and second selecting means for operating one of said second guide means and said viewfinder when the video camera is in a reproduction mode.

6. A video camera according to claim 5, wherein said first guide means guides said light picked up by said pick up lens system directly to said image pickup element without passing said light through said liquid crystal display panel.

7. A video camera apparatus comprising:

a pickup lens system for picking up light from an object;

an image pickup element for picking up said light from said light pickup lens system, and for converting said into an image signal;

recording means for recording said image signal in a memory;

reproducing means for reproducing said image signal recorded in said memory;

projecting means for projecting a display image through said pickup lens system, said display image corresponding to said image signal reproduced by said reproducing means, a direct-view type viewfinder for displaying an image of said light picked up by said image pickup element and an image corresponding to said image signal reproduced by said reproducing means, a diameter of said viewfinder being larger than that of said pickup lens system; and selecting means for operating one of said projecting means and said viewfinder means when the video camera is in a reproducing mode.

8. A video camera according to claim 7, wherein said image pickup lens element directly picks up said light from said image pickup system without said light passing through said projecting means.

9. A video camera apparatus comprising:

a pickup lens system for picking up image light from an object;

an image pickup element means mounted on a substrate for converting said image light into an image signal;

a liquid crystal display panel means mounted on said substrate for displaying a display image corresponding to said image light;

a light source for irradiating light on said liquid crystal display panel means when said display image on said liquid crystal display panel is projected;

first guide means defining a first guide path for guiding light from said light source to said liquid crystal display panel means so as to project said display image on said liquid crystal display panel means;

second guide means defining a second guide path for guiding said image light from said pickup lens system to said pickup element means; and selecting means for selectively operating one of said first and second guide means to cause light to pass through one of said first and second guide paths.

10. A video camera apparatus according to claim 9, wherein said selecting means includes moving means for moving one of said substrate and said pickup lens system between a first position and a second position, and wherein said selecting means selectively operates one of said first and second guide means responsive to a selective movement of said substrate between said first and second positions.

11. A video camera apparatus according to claim 9, wherein said selecting means includes moving means for selectively moving said pickup lens system between a first position and a second position, and wherein said selecting means operates one of said first and second guide means responsive to a selective movement of said pickup lens system between said first and second positions.

12. A video camera apparatus comprising:

a lens system for picking up image light from an object;

a movable substrate which is located at a first position when the video camera is in an image pick up mode and which is located at a second position when the video camera is in an image projection mode;

an image pickup element mounted on said movable substrate for converting said image light picked up by said lens system into an image signal, said image pickup element facing said lens system at a predetermined distance from said lens system when said substrate is located at said first position;

a liquid crystal display panel means mounted on said movable substrate for displaying a display image, said liquid crystal display panel facing said lens system at a second predetermined distance from said lens system for projecting said display image when said substrate is located at said second position; and a light source for irradiating light through said liquid crystal display panel means to said lens system so that said display image on said liquid crystal display panel means is projected when the video camera is in said projection mode.

13. A video camera apparatus comprising:

a lens system movable between first and second positions, said lens system picking up image light from an object in said first position, and said lens system projecting an image in said second position;

an image pickup element for converting image light picked up by said lens system into an image signal, said image pickup element facing said lens system at a predetermined distance from said lens system when said lens system is located at said first position;

a liquid crystal display panel for displaying a display image, said liquid crystal display panel facing said pickup lens system at a second predetermined distance from said lens system for projecting said display image when said lens system is located at said second position; and a light source for irradiating light through said liquid crystal display panel means to said lens system so that said display image on said liquid crystal display panel means is projected when the video camera is in a projection mode.

* * * * *